United States Patent [19]

Brown

[11] Patent Number: 5,762,976
[45] Date of Patent: Jun. 9, 1998

[54] HOT RUNNER MANIFOLD FOR THERMALLY SENSITIVE RESINS

[76] Inventor: Paul Phillip Brown, 925 Wind Drift Dr., Carlsbad, Calif. 92009

[21] Appl. No.: 597,617

[22] Filed: Feb. 6, 1996

[51] Int. Cl.⁶ .................................................. B29C 45/22
[52] U.S. Cl. .................. 425/190; 264/297.2; 264/328.8; 425/549; 425/572
[58] Field of Search ............................... 425/549, 572, 425/190; 264/297.2, 328.8

[56] References Cited

U.S. PATENT DOCUMENTS

| | | | |
|---|---|---|---|
| 3,923,209 | 12/1975 | Roy | 224/478 |
| 4,256,140 | 3/1981 | Swaroop et al. | 137/561 |
| 4,299,553 | 11/1981 | Swaroop | 425/572 |
| 4,391,579 | 7/1983 | Morrison | 425/549 |
| 4,588,367 | 5/1986 | Schad | 425/549 |
| 4,648,546 | 3/1987 | Gellert | 228/161 |
| 4,682,945 | 7/1987 | Schad | 425/549 |
| 4,932,858 | 6/1990 | Gellert | 425/572 |
| 5,295,806 | 3/1994 | Gunther | 425/547 |
| 5,366,369 | 11/1994 | Gellert | 425/549 |
| 5,441,197 | 8/1995 | Gellert et al. | 228/248 |
| 5,518,393 | 5/1996 | Gessner | 425/549 |

*Primary Examiner*—Tim Heitbrink
*Attorney, Agent, or Firm*—Don E. Erickson

[57] ABSTRACT

A hot runner manifold and a method for making such, comprising a runner, a heating element, a sprue hole defined by said manifold and communicating with said runner at an intersection, said runner, having opposing ends, at least two nozzle drops communicating with the opposing ends of the runner at intersections, all of said intersections describing abrupt changes in direction, a runner insert sealably disposed within the manifold at each point of intersection, said insert defining a toroidal orifice, said insert having one inlet and at least one outlet, said inlet and outlet positioned to enable communication with the runner, and the orifice being free of sharp edges. The insert may be employed to change the level of flow of plastic within said manifold.

13 Claims, 7 Drawing Sheets

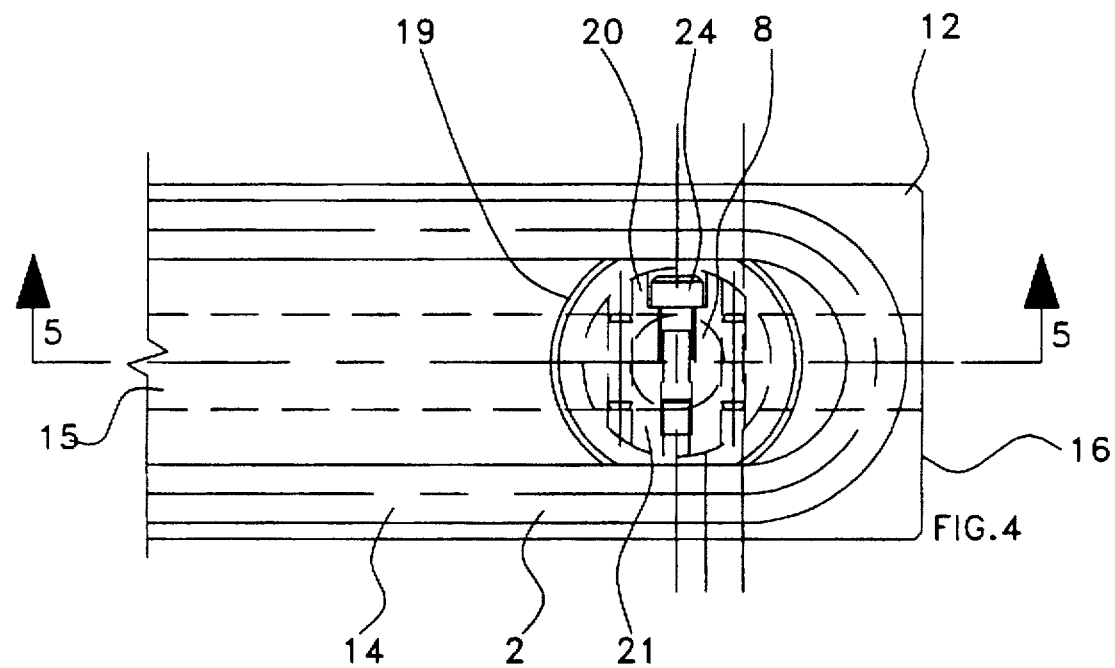
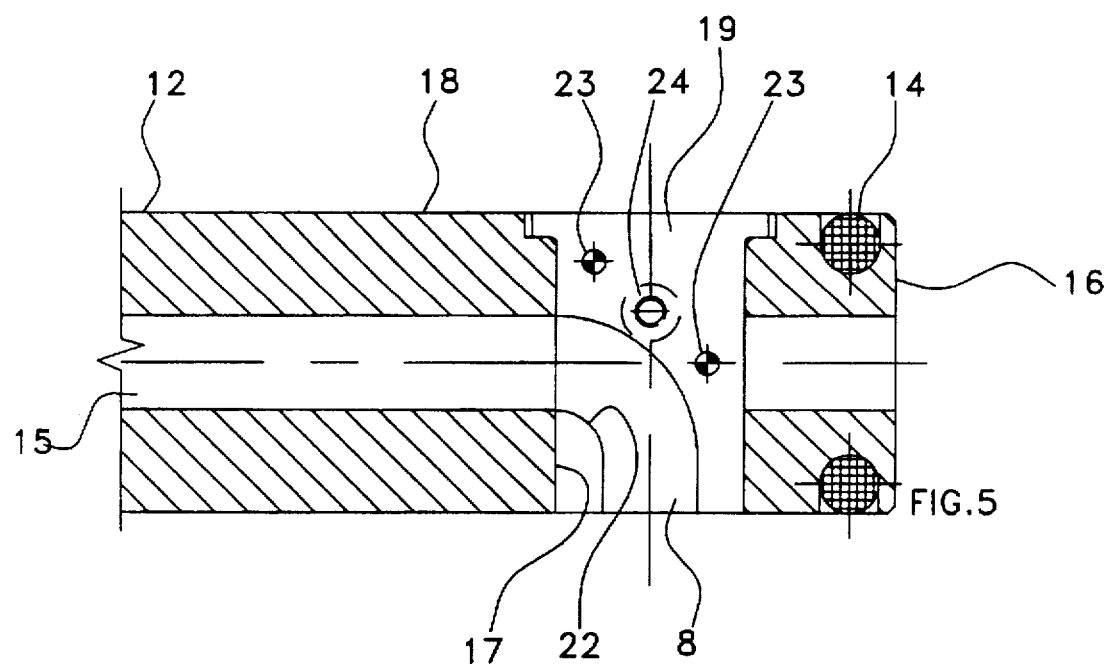

HOT RUNNER MANIFOLD FOR THERMALLY SENSITIVE RESINS

FIELD OF INVENTION

The present invention relates to a hot runner manifold for injection molding thermally sensitive resins. The manifold is constructed in such a way to eliminate internal sharp corners at the intersection of the runner passages. The invention further includes an improved method of redirecting the flow and/or changing runner levels within the manifold for the purpose of distributing the resin in the manifold.

BACKGROUND OF THE INVENTION

Typically externally heated hot runner manifolds with internally drilled runner passages are used when injecting resins into multi-cavity molds. Plastic resin injected through a runner passage flows slower against the runner wall than at the runner center. Therefore the resin closest to the runner wall will have the longest residence time in the runner and have a higher risk of degradation through time and temperature. Adding to this problem is the fact that the shear heat generated in the runner passage is at its highest at the runner wall. The thermal history of the resin can be affected by modifying the geometry of the manifold to affect the flow of the resin through the manifold. This can be achieved by analyzing the flow and introducing runner level changes at strategic points. The objective of this strategy is to ensure that each manifold drop receives resin with a similar time and temperature history. However, introducing runner level changes at strategic points creates another problem, that of sharp corners, or edges, within the manifold. Sharp corners in the manifold occur wherever two or more passages intersect within the runner system.

It is well known that thermally sensitive resin is sheared and thus overheated when injected under pressure over such a sharp corner. Such shearing and overheating frequently causes the formation of unwanted chemical byproducts such as gas bubbles and burned particles in the resin flow. For example, when polyvinylchloride (PVC) is overheated, a byproduct such as a chloride gas is formed which would result in the formation of a corrosive acid. In another example, when polyethyleneterepthalate (PET) is overheated, acetaldehyde is formed within the resin. When the finished product is a hollow container such as a bottle, the acetaldehyde thus formed will slowly be released from the resin into the bottle, and such acetaldehyde will have a detrimental affect on the subsequently bottled product. In products for human consumption, acceptable levels of acetaldehyde generation have been established based on the performance limitations of existing injection molding systems.

DESCRIPTION OF THE PRIOR ART

U.S. Pat. No. 4,648,546 to Gellert shows a manifold that appears to be well balanced but is inherently out of balance according to the above widely accepted theory. Additionally, prior art has not successfully addressed elimination of all the sharp corners in multi-level manifolds. For example, U.S. Pat. No. 4,299,553 to Swaroop shows a distribution plug in the sprue area of a circular eight-cavity manifold. Other than the sprue area, there are no intersections of the primary runners with secondary runners and no changes of runner level are described. The distribution plug is of tapered form with the distribution passages machined partly into the plug and partly into the manifold. The distribution plug is threaded into the manifold and must only be tightened sufficiently to allow alignment of the distribution passages. U.S. Pat. No. 3,923,209 to Roy shows a method of manufacturing a circular eight-cavity manifold which is devoid of internal sharp corners. While this invention is of interest, it is limited in its application to circular manifolds.

In addition to the prior art described in the patents noted above, the following methods are well known to one of ordinary skill in the injection molding field: (1) Inserting a tapered plug at the point of intersection of two runners to block the hole created by drilling one of the two runners. Then, at the intersection of the two runners, boring the insert with a spherical radius cutter along the axis of the second ruler to make a curved surface on the inserted plug at the outer portion of the intersection. However, this method does not eliminate the sharp corner at the inner surface of the intersection, and also requires a plug to seal the sprue/runner intersection. (2) Manufacturing a manifold of two halves wherein the runner is defined between the opposing two halves of the manifold and wherein the surfaces of the runner are machined to have no sharp corners. The two manifold halves are then fused together. The problem with this method is that the runner is restricted to only one plane. (3) Inserting a valve bushing which has a torus shaped passage into a hole bored at the intersection of two runners. This method eliminates only the sharp edges at the intersection at the drop location and also requires the use of a plug to seal runner intersections.

While the above hot runner designs are operable, none of the prior art discussed solves the problem of designing a multi-level, multi-cavity hot runner system which is free of sharp corners at all of the intersections of the runners. Typically, an 8-cavity, multi-level manifold will have as many as 22 sharp edges. The problem is magnified with manifolds for injection systems with more cavities.

SUMMARY OF THE INVENTION

It is an object of the present invention to provide a hot runner manifold which permits the molding of plastic products, such as preforms, with lower levels of unwanted chemical byproducts due to degradation. It is a further object of the present invention to provide an improved means of changing runner levels within the hot runner manifold and permitting the molding of preforms with lower levels of unwanted chemical byproducts due to degradation. These and other objects and advantages will become apparent from the following description and drawings in which like reference numerals depict like elements.

BRIEF DESCRIPTION OF THE DRAWINGS

FIG. 4 is an illustration of a hot ruiner manifold showing the preferred embodiment of the invention.

FIG. 5 is a sectional view through line A—A FIG. 10.

DESCRIPTION OF THE INVENTION

Those skilled in the art of mold and hot runner design are familiar with the need to change runner levels within the manifold to redirect the flow of resin within the manifold. Most constructions of multi-level, multi-cavity manifolds result in each manifold having numerous sharp edges at runner intersections.

Consequently it is a prime feature of the present invention to describe a manifold, and a method for making such for use in the injection molding of preforms for injection blow molded products, such as bottles, such that the product will exhibit lower levels of undesired byproducts, such as acetaldehyde or corrosive gases, than is allowed in presently accepted standards. It is a further feature of the present invention to provide a hot runner manifold that is free of sharp corners or edges at the intersections of the runners. A further feature of the present invention is to provide a hot runner manifold that does not require the use of tapered plugs to seal the runners.

Figure 1:
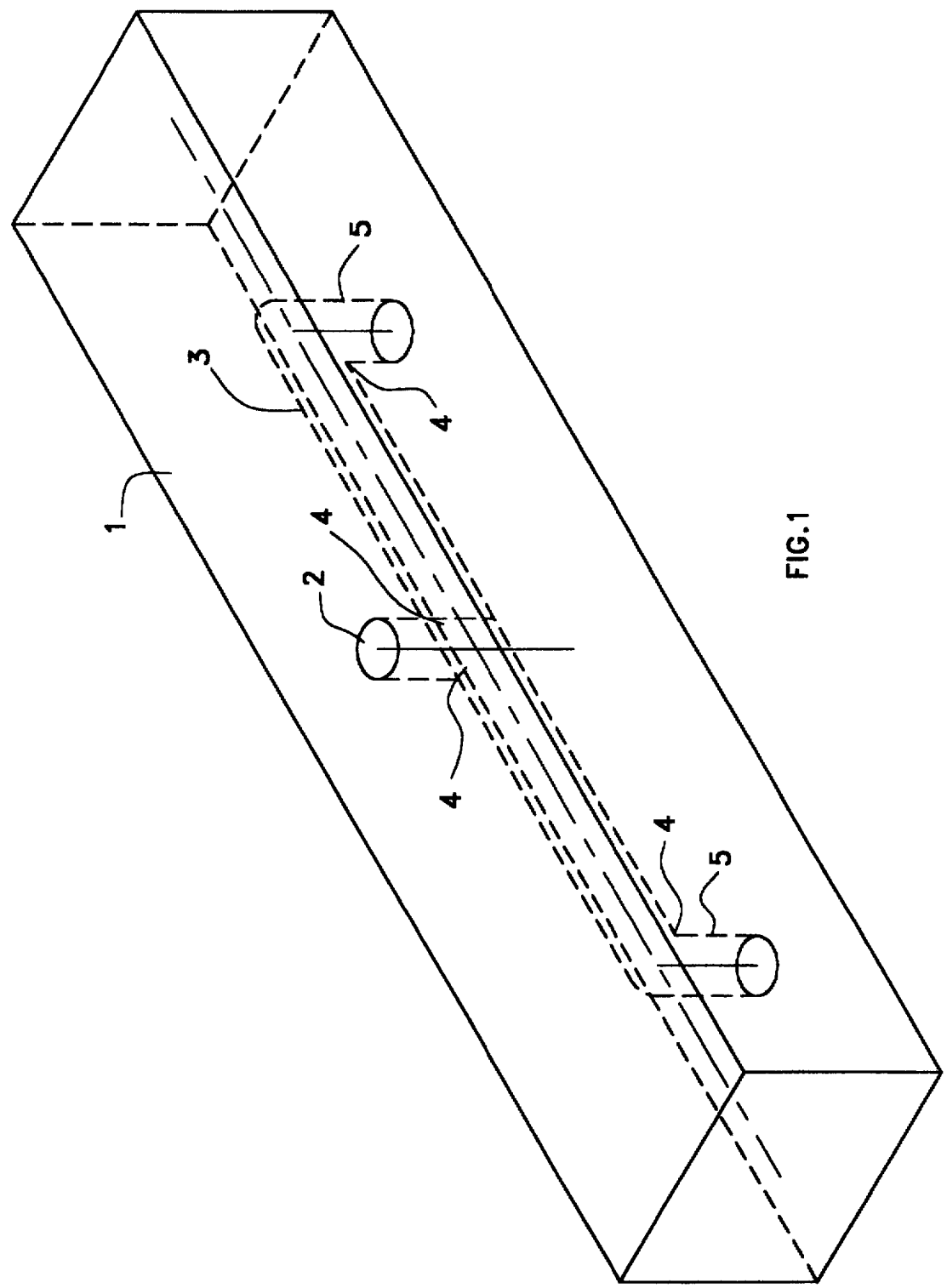
FIG. 1 is a three dimensional view of a manifold with a sprue and two nozzle drops.

The hot runner manifold systems of the present invention are characterized by the presence of a contoured runner insert at each runner intersection. A hot runner manifold in accordance with the present invention comprises a manifold block and a heating element associated with the apparatus for maintaining the appropriate process temperature. FIG. 1 is a three-dimensional view of a basic manifold 1 with an entry sprue 2, a single runner 3, and two nozzle drops 5. Without additional machining, two sharp corners 4 exist at the intersects of the sprue 2 and the runner 3, and two sharp corners 4 exist at each of the intersections of the runner 3 and the nozzle drops 5. Heating elements are existing state of the art and not shown. Current technology would permit the elimination of only some of the sharp edges, or corners. The invention described herein would result in the elimination of all sharp edges of FIG. 1.

Figure 2:
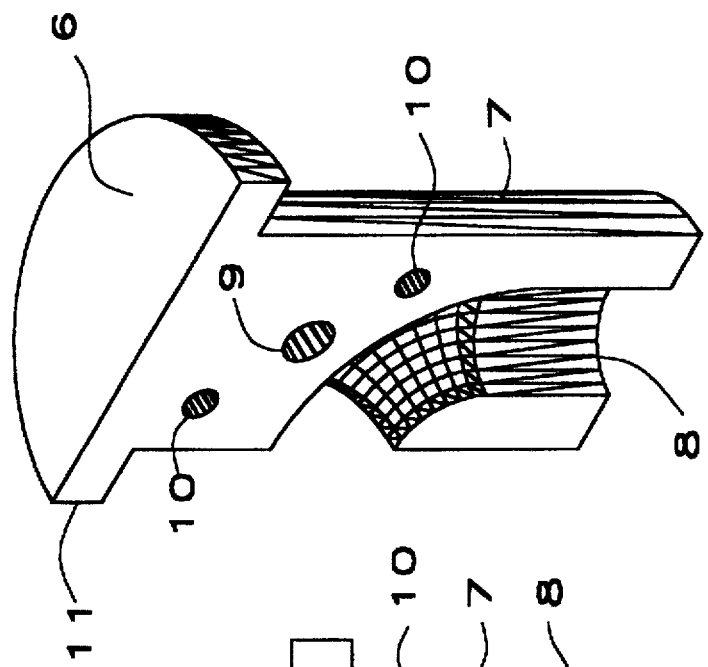
FIG. 2 is a three-dimensional view of an insert of the invention having one outlet.
Figure 3:
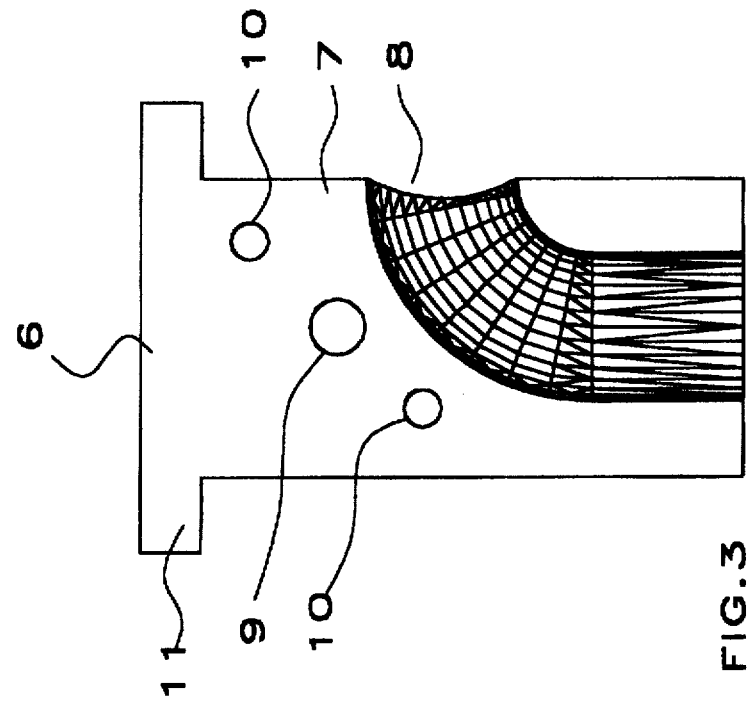
FIG. 3 is a plan view of the insert of FIG. 2.

FIGS. 2 and 3 depict an insert half 6 comprised of a semi-cylindrical shaped body 7 forming an interior half-toroid recess 8 of smooth surface. In the exemplary embodiment a fastener hole 9 is shown for connecting insert half 6 with its complementary insert half, and two dowel holes 10 are shown for assuring proper alignment of the two insert halves 6. An insert is formed by adjoining two complementary insert halves. The exemplary embodiment depicts a shoulder 11 for ease of aligning the insert in the manifold, however, such is not necessary to employ the invention.

Other features and advantages of the present invention will become more apparent from an examination of the succeeding specifications when read in conjunction with the appended drawings.

DETAILED DESCRIPTION OF THE PREFERRED EMBODIMENT

Referring now to FIGS. 4 and 5, manifold 12 is heated externally and/or internally by tubular elements 14. Runner 15 is drilled from face 16. Manifold 12 is bored 17 from face 18 to receive runner insert 19, comprised of insert halves 20 and 21. Runner insert 19 is manufactured from two halves 20 and 21 to allow runner passage 8 to be machined to provide a radius 22 at the inside corner of the junction, thereby eliminating a sharp edge. Runner insert halves 20 and 21 are assembled with dowels 23 and a socket head cap screw 24. Although dowels are used for alignment in this embodiment, those of ordinary skill in the art will recognize that other means of alignment may be employed, such as key slots, or the combination of dowels and key slots. Similarly, other means of fastening the two halves may be employed, such as retaining rings or brazing. Prior to assembly, manifold 12 is heated and runner insert 19 is cooled to provide a shrink fit of insert 19 to the manifold 12.

Figure 6:
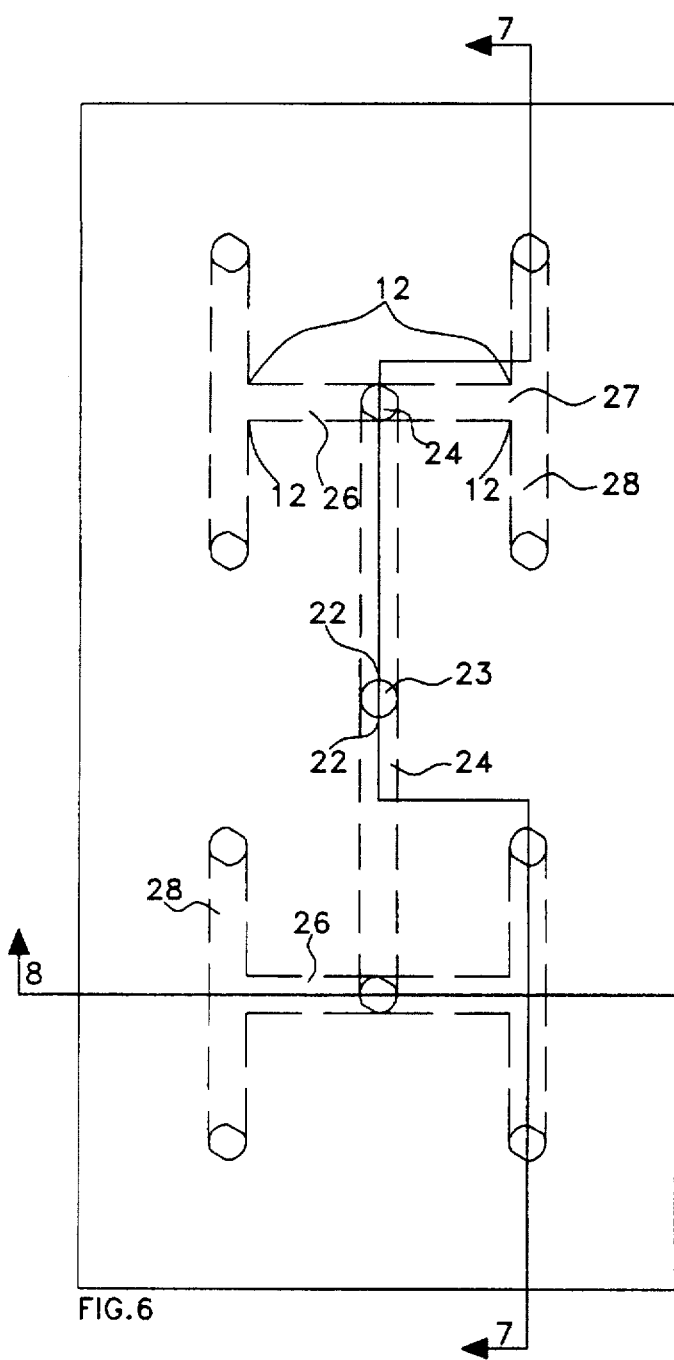
FIG. 6 is an illustration of the preferred embodiment showing an eight drop hot runner system.
Figure 7:
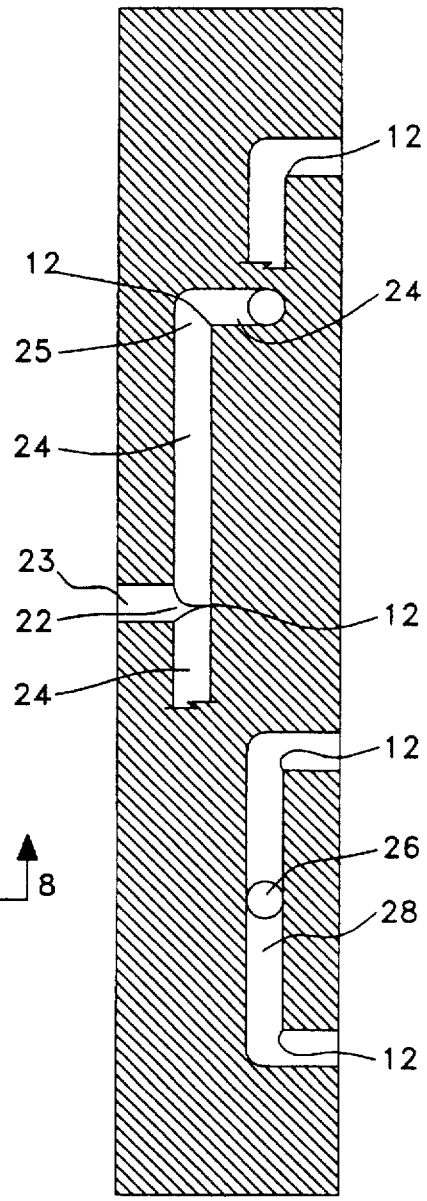
FIG. 7 is a section along, the line A—A of FIG. 6.
Figure 8:
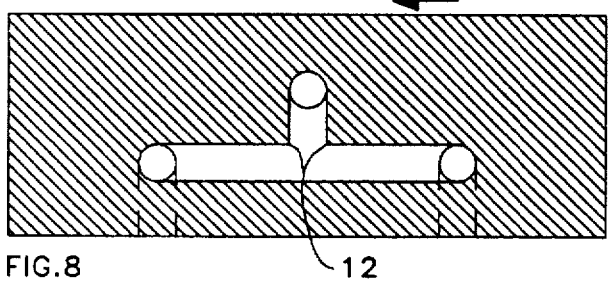
FIG. 8 is a section along the line B—B of FIG. 6.
Figure 10:
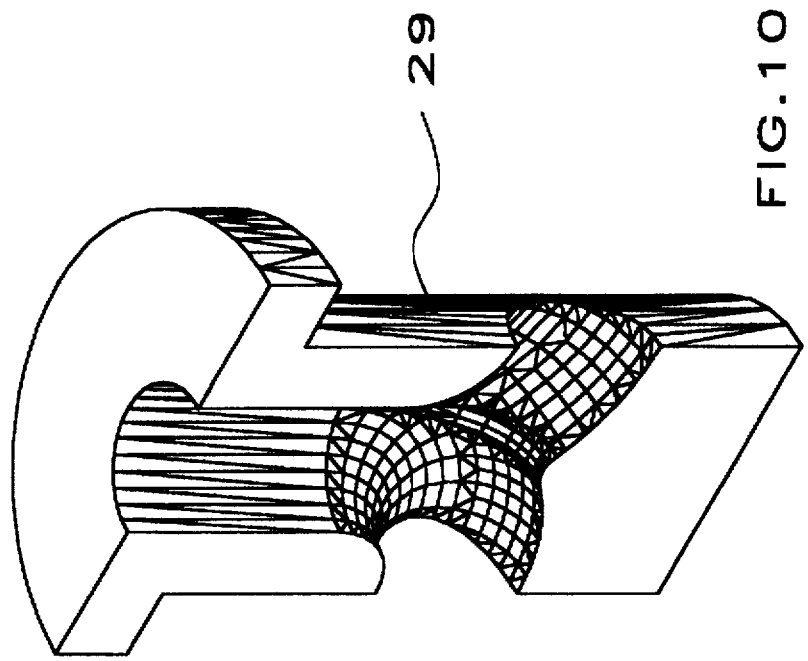
FIG. 10 is a plan view of the insert of FIG. 9.
Figure 9:
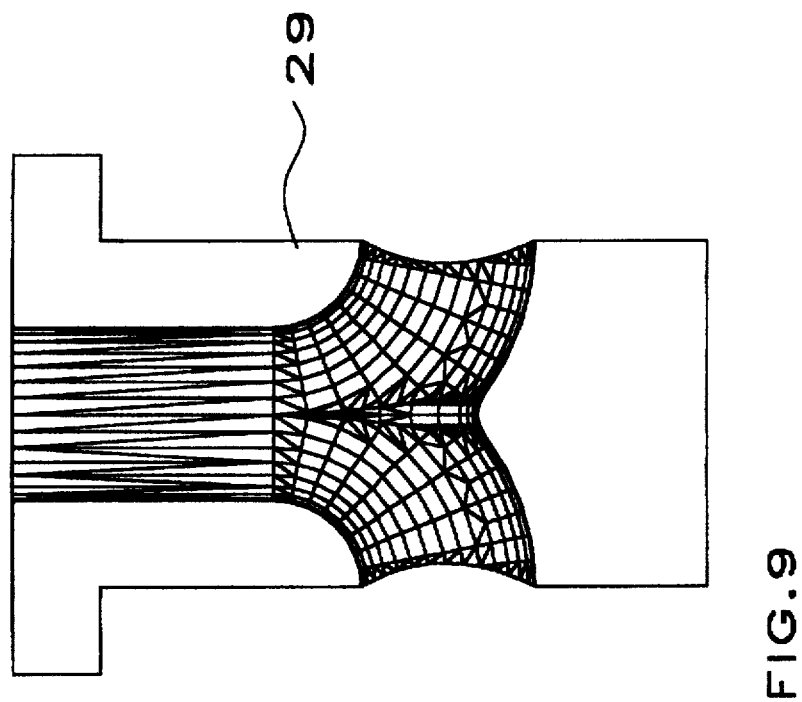
FIG. 9 is a three-dimensional view of a sprue insert with two outlets.
Figure 11:
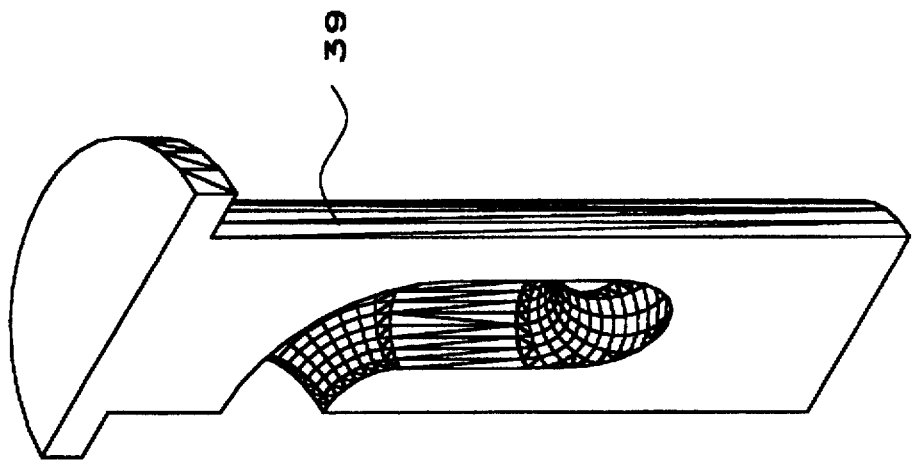
FIG. 11 is a three-dimensional view of an runner insert with two outlets and a change of runner level.
Figure 12:
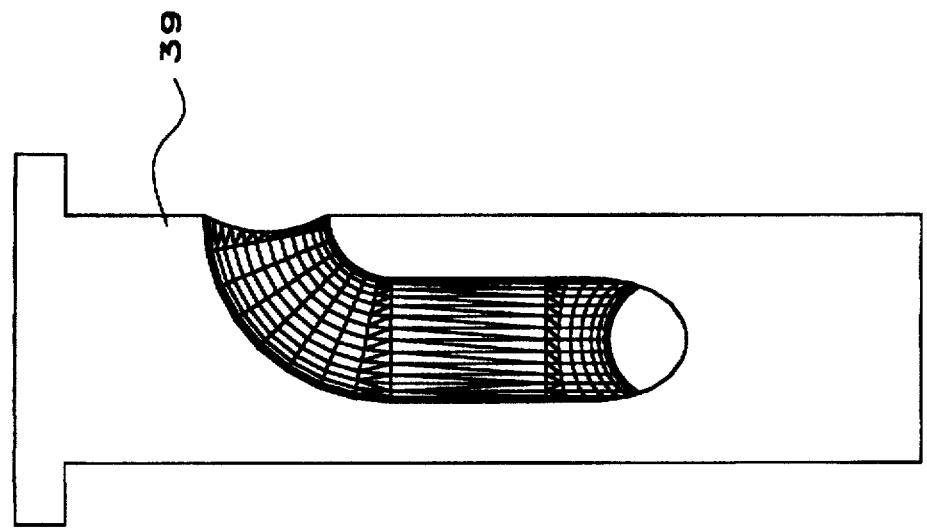
FIG. 12 is a plan view of the insert of FIG. 11.
Figure 13:
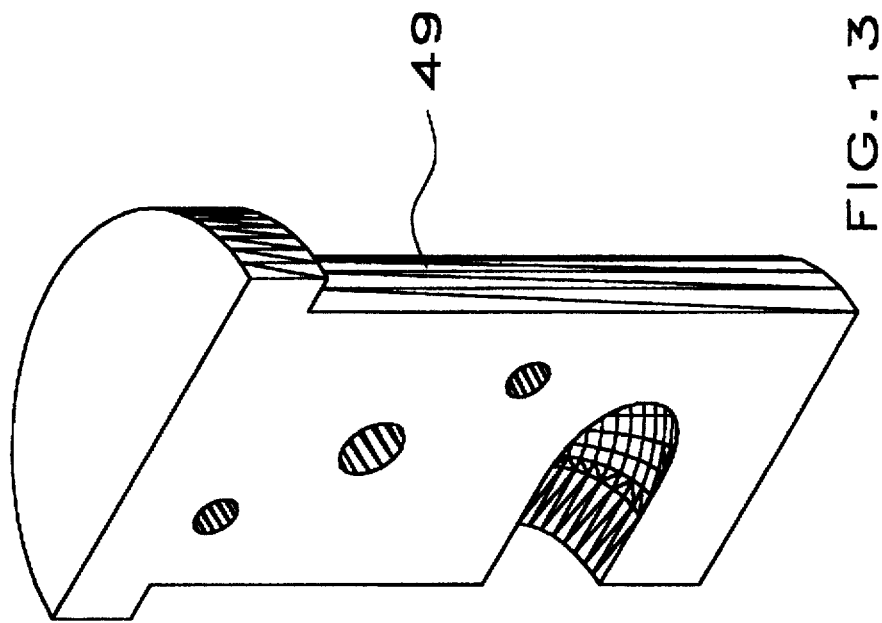
FIG. 13 is a trhee-dimensional view on an runner insert with one inlet and two outlets on the same plane.
Figure 14:
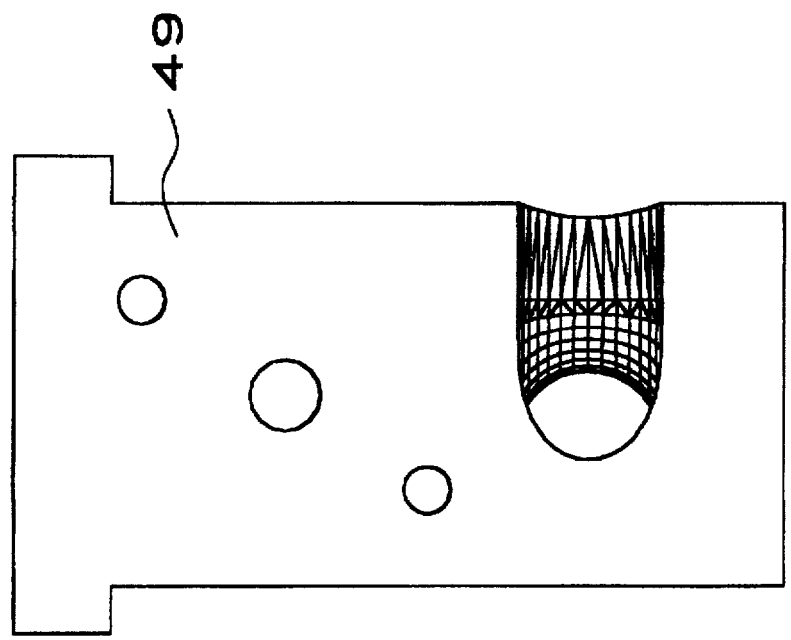
FIG. 14 is a plan view of the insert of FIG. 13.

An eight cavity mold is used to describe the preferred embodiment of the invention, however typical production hot runner systems have sixteen, twenty-four, forty-eight, seventy-two or ninety-six cavities. The invention is equally applicable to all multi-level, multi-cavity manifolds. Referring to FIGS. 6, 7 and 8, manifold 30 is provided with runner insert 19 at eight locations. Similarly constructed runner insert 29, one complementary half of which is depicted in FIGS. 9 and 10, is provided at the location of the sprue. Insert 29 has one inlet orifice and two outlet orifices. Similarly constructed insert 39, one complementary half of which is depicted in FIGS. 11 and 12, is provided at the point of change of level between primary runner 3 and secondary runner 32. Similarly constructed insert 49, one complementary half of which is depicted in FIGS. 13 and 14, is provided at the point of intersection between secondary runner 32 and third runner 33. Insert 49 connects two runners on the same plane. Thus formed, the manifold 30 is free of sharp corners at all of the intersections of the sprue and runner passages, and all drilled runner passages are sealed without the need for tapered plugs.

While the present description contains many specificities, these should not be construed as limitations on the scope of the invention, but rather as an exemplification of one/some preferred embodiment/s thereof. Many other variations are possible. For example, inserts have been described which have one or two outlet orifices, however, inserts may be employed that have more than two orifices. Accordingly, the scope of the invention should not be determined by the specific embodiment/s illustrated herein, but the full scope of the invention is further illustrated by the claims appended hereto.

I claim:

1. A hot runner manifold having an upper surface and a lower surface, the manifold comprising:
    (a) a first insert located in a cylindrical cavity in the surface of the manifold, the first insert for receiving a material from a sprue, the first insert providing a pathway for the material to a primary runner;
    (b) the primary runner disposed at a first level within the manifold, the primary runner defining an elongated cylindrical pathway for the material, the primary runner having at least two orifices for communicating with at least two secondary inserts;
    (c) the secondary inserts for communicating between the primary runner and a secondary runner, the secondary inserts for providing a pathway for the material between the primary runner and the secondary runner;
    (d) the secondary runner disposed within the manifold and providing an elongated, cylindrical pathway for the material, the secondary runner for communicating with tertiary insert means providing a pathway for the material to at least two nozzles for the injection of the material in a cavity; and
    wherein each insert is sealably disposed within the manifold, said insert defining a toroidal orifice, said insert having one inlet and at least one outlet, and the orifice being free of sharp edges.

2. The manifold according to claim 1 wherein the insert is shrink fitted to the manifold.

3. The manifold according to claim 1 wherein at least one insert is used in conjunction with a valve gate mechanism.

4. The manifold according to claim 1 wherein secondary the insert changes the level of flow of material within said manifold.

5. The manifold according to claim 1 wherein the tertiary insert means are nozzle drops providing a pathway for the material to the nozzles.

6. The manifold of claim 1 wherein the secondary runner is disposed at a second level within the manifold, such second level being laterally displaced and parallel to the first level.

7. The manifold of claim 1 wherein the tertiary insert means comprises:

(a) at least one tertiary insert for communicating between the secondary runner and at least one tertiary runner, the tertiary insert providing a pathway for the material between the secondary runner and the tertiary runner;

(b) the tertiary ruiner disposed within the manifold and providing an elongated, cylindrical pathway for the material, the tertiary runner communicating with a fourth insert means for providing a pathway for the material to at least two nozzles for the injection of the material in a cavity.

8. The manifold according to claim 7 wherein the tertiary insert changes the level of flow of material within said manifold.

9. A hot runner manifold insert for connecting runners in a manifold, the insert comprising:

(a) two or more symmetrical opposing pieces having a head, a foot, and a machined surface defining a toroidal orifice therebetween;

(b) said orifice defining an inlet substantially intermediate in the machined surface of each opposing piece and an outlet substantially toward the foot of each opposing piece, said orifice being free of sharp edges;

(c) alignment means for aligning the opposing pieces;

(d) a fastener for connecting said opposing pieces; and whereby such insert may be sealably inserted in the manifold.

10. The insert according to claim 9 wherein the orifice has at least two outlets.

11. The insert according to claim 10 wherein the symmetrical opposing pieces are generally cylindrical.

12. The insert of claim 10 wherein the alignment means are dowels.

13. The insert according to claim 10 wherein the fastener is a socket head cap screw.

* * * * *